(12) United States Patent
Grupp

(10) Patent No.: US 6,271,975 B1
(45) Date of Patent: *Aug. 7, 2001

(54) LIGHT COLLECTING OPTICAL DEVICE FORMING A MULTIPLE FOCAL DISTANCE LENS

(75) Inventor: Joachim Grupp, Neuchâtel (CH)

(73) Assignee: Asulab S.A., Bienne (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,033

(22) Filed: Apr. 8, 1999

(30) Foreign Application Priority Data

Apr. 9, 1998 (CH) .................................................. 846/98

(51) Int. Cl.[7] ................................. G02B 3/10; G02B 9/00
(52) U.S. Cl. ........................................... 359/721; 359/796
(58) Field of Search ......................... 359/721, 796, 359/676–693, 381, 384, 419–422, 197, 209–210, 672–675

(56) References Cited

U.S. PATENT DOCUMENTS

| 4,422,721 | * 12/1983 | Hahn et al. ........................... 359/585 |
| 5,027,144 | 6/1991 | Ohno .............................. 354/195.12 |
| 5,369,450 | * 11/1994 | Haseltine et al. ..................... 348/745 |
| 5,396,367 | 3/1995 | Ono et al. ............................. 359/687 |
| 5,499,072 | 3/1996 | Nanjo ................................... 354/222 |
| 5,515,206 | 5/1996 | Peng ..................................... 359/721 |
| 5,784,209 | 7/1998 | Manabe ................................ 359/720 |

FOREIGN PATENT DOCUMENTS 0 566 073 A1  10/1993 (EP) .

* cited by examiner

Primary Examiner—Jordan M. Schwartz
(74) Attorney, Agent, or Firm—Griffin & Szipl, P.C.

(57) ABSTRACT

A multiple focal distance light collecting optical device, is characterised in that it consists of a monoblock structure formed of at least a first and a second transparent material (8, 10) formed into lenses (12, 14, 16,) which are applied against and attached to each other the refractive indices and radii of curvature of the faces of such lenses being determined to focus the light rays so as to create an image in accordance with at least two different focal distances (A, B).

21 Claims, 4 Drawing Sheets

LIGHT COLLECTING OPTICAL DEVICE FORMING A MULTIPLE FOCAL DISTANCE LENS

FIELD OF THE INVENTION

The present invention concerns a light collecting optical device forming a lens of small dimension, in order to be able to be integrated, for example in a compact photographic camera, and allowing standard photographs or telephoto photographs to be taken.

BACKGROUND OF THE INVENTION

The essential elements of a camera are the body, the lens assembly, the shutter which allows light to enter for a sufficiently short period of time, and a photosensitive film for recording the image. In order to produce very short exposures, a lens assembly with a great aperture must be used. For a high quality camera, this means a complex lens assembly in which aberrations of the elements tend to compensate each other.

Camera lens assemblies are characterised by two parameters. One of the two is the focal distance f which depends on the one hand on the refractive indices of the external medium and the lenses which constitute it, and on the other hand, the radius of curvature of such lenses. The second parameter which characterises a photographic lens assembly is its aperture, usually expressed with respect to the focal distance. An f/8 lens, for example, has an aperture equal to an eighth of the focal distance. The intensity of the image formed on the film is a function of the lens aperture. Practically all cameras have a lens assembly fitted with a diaphragm in order to be able to modify the aperture thereof.

Two families of cameras currently exist on the market. One of these families is formed by box cameras with interchangeable lens assemblies onto which lenses with different focal distances can be fitted as required. The other family concerns compact cameras which appeared on the market around fifteen years ago. These cameras are generally characterised by their compactness and great simplicity of use. They include a lens assembly which cannot be removed and whose focal distance may be fixed or variable.

In practice, when the lens assembly has a fixed focal distance, the lenses of which it is formed are arranged in the inner volume of the compact box. This method of construction allows sealing of the camera to be assured. Conversely, the user has only one magnification available defined by the optical geometry of the lens assembly. Lens assemblies with variable focal distances, also called zoom lenses, offer the user a continuous magnification range, but project from the front of the camera, which is detrimental to the sealing of the camera.

In order to overcome this problem, integrating an optical device forming a multiple focal distance lens assembly in the box of compact cameras has been proposed, a known embodiment thereof being shown in FIG. 1 annexed hereto. Such a device designated as a whole by the general numerical reference 1, conventionally includes two pairs of parallel lenses opposite each other, 2 and 4. The refractive indices and the radii of curvature of the faces of these lenses 2, 4 are adjusted so as to obtain the desired focal distances, represented by the directions A and B in FIG. 1. In practice, one of these focal distances which can be, for example, 38 or 50 mm, must allow standard photographs to be taken, whereas the other focal distance provides a telephoto type magnification. As focal distances A and B defined by the two pairs of lenses 2, 4 are perpendicular to each other, optical device 1 need only be pivoted by a quarter revolution to pass from a standard mode photograph to a telephoto mode photograph.

Device 1 above has a double advantage. On the one hand, it can be easily integrated into the inner volume of a compact box camera, which allows the aforementioned sealing problems to be avoided. On the other hand, it offers the user the possibility of choosing between two different magnifications.

Optical device 1 also has, however, certain drawbacks. As a single lens does not generate a high quality image, lenses 2, 4 are preferably arranged in pairs in order to compensate chromatic aberrations. As it passes through device 1, the light is refracted at each lens/air interface, so that it is difficult to produce a suitably focused image. Lenses 2, 4 must also be cut and assembled with great precision, which substantially increases the cost price of such structures.

SUMMARY OF THE INVENTION

An object of the present invention is to overcome the above problems and drawbacks, by providing an optical device forming a lens assembly of small dimensions in particular in order to be able to be integrated into a compact camera.

The present invention therefore concerns a multiple focal distance light collecting optical device, characterised in that it consists of a monoblock structure formed of at least a first and a second transparent material shaped into lenses which are attached to and applied against each other, the refractive indices and radii of curvature of the faces of such lenses being determined to focus the light rays so as to create an image in accordance with at least two different focal distances.

As a result of these features, the present invention provides an inexpensive and compact optical device, so that it can easily be integrated for example into the box of a compact camera. Moreover, the monolithic structure of the device according to the invention allows the light reflection phenomena at the lens/air interfaces to be avoided, so that it is possible to obtain a high quality image.

BRIEF DESCRIPTION OF THE DRAWINGS

Other features and advantages of the present invention will appear more clearly upon reading the detailed description which follows of an embodiment example of an optical device according to the invention, this example being given purely by way of non limiting illustration, in conjunction with the annexed drawings, in which.

DESCRIPTION OF THE INVENTION

A preferred application example of the optical device according to the invention relates to compact cameras. As a result of the present invention, it is possible to offer the user the possibility of choosing between several magnifications, while guaranteeing sealing of the camera. It goes without saying however, that the present device could be applied to any other optical system such as, for example, a laser beam system, in which it is necessary to focus light at two different distances.

Figure 2:
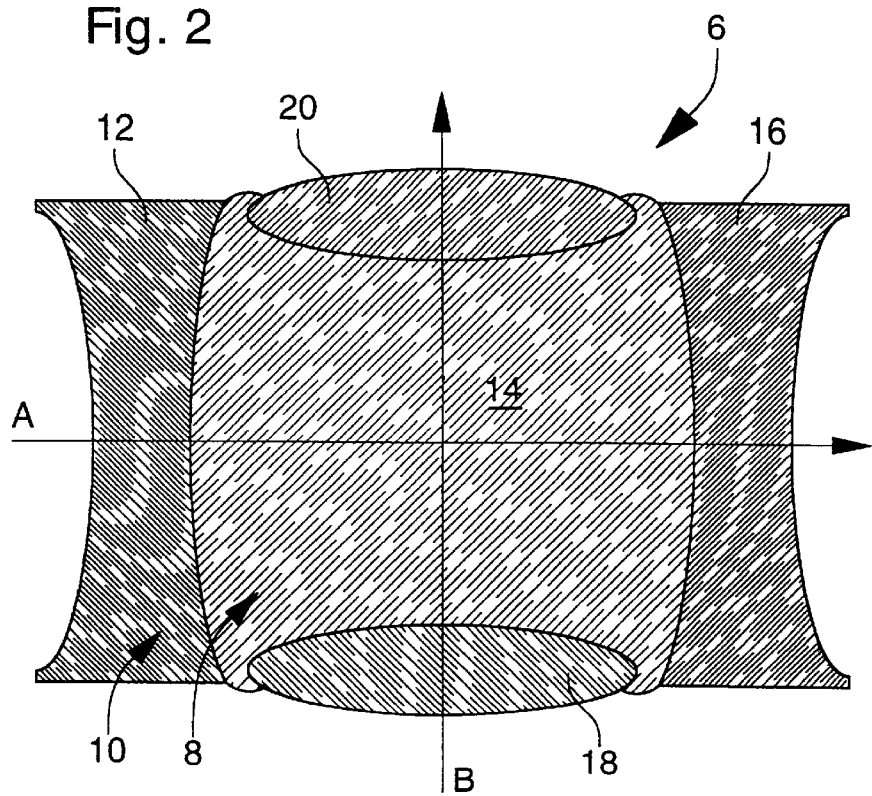
FIG. 2 is a schematic view of the multiple focal device according to the invention.

As is shown by FIG. 2, the optical device according to the invention, designated as a whole by the numerical reference 6, has the form of a monoblock part whose general external shape substantially enters a parallelepiped. According to the invention, device 6 is formed of a first and a second transparent material, respectively 8 and 10, shaped in two triplets of lenses 12, 14 and 16 on the one hand, and 18, 14 and 20 on the other hand, which are applied against and attached to each other to focus light rays so as to create an image. The refractive indices and the radii of curvature of the faces of lenses 12 to 20 are determined so as to obtain the desired focal distances A and B. In practice, focal distance A determined by the lens triplet 12, 14, 16 can be for example 50 mm, to allow standard photographs to be taken, whereas focal distance B, determined by lens triplet 18, 14, 20 can be adapted so as to provide a telephoto type magnification. Lenses 12 to 20 are arranged so that focal distances A and B are perpendicular to the lateral faces of optical device 6 and form between them a right angle. Optical device 6 according to the invention need then only be pivoted by a quarter revolution to pass from standard mode photographs to telephoto mode photographs.

Figure 5:
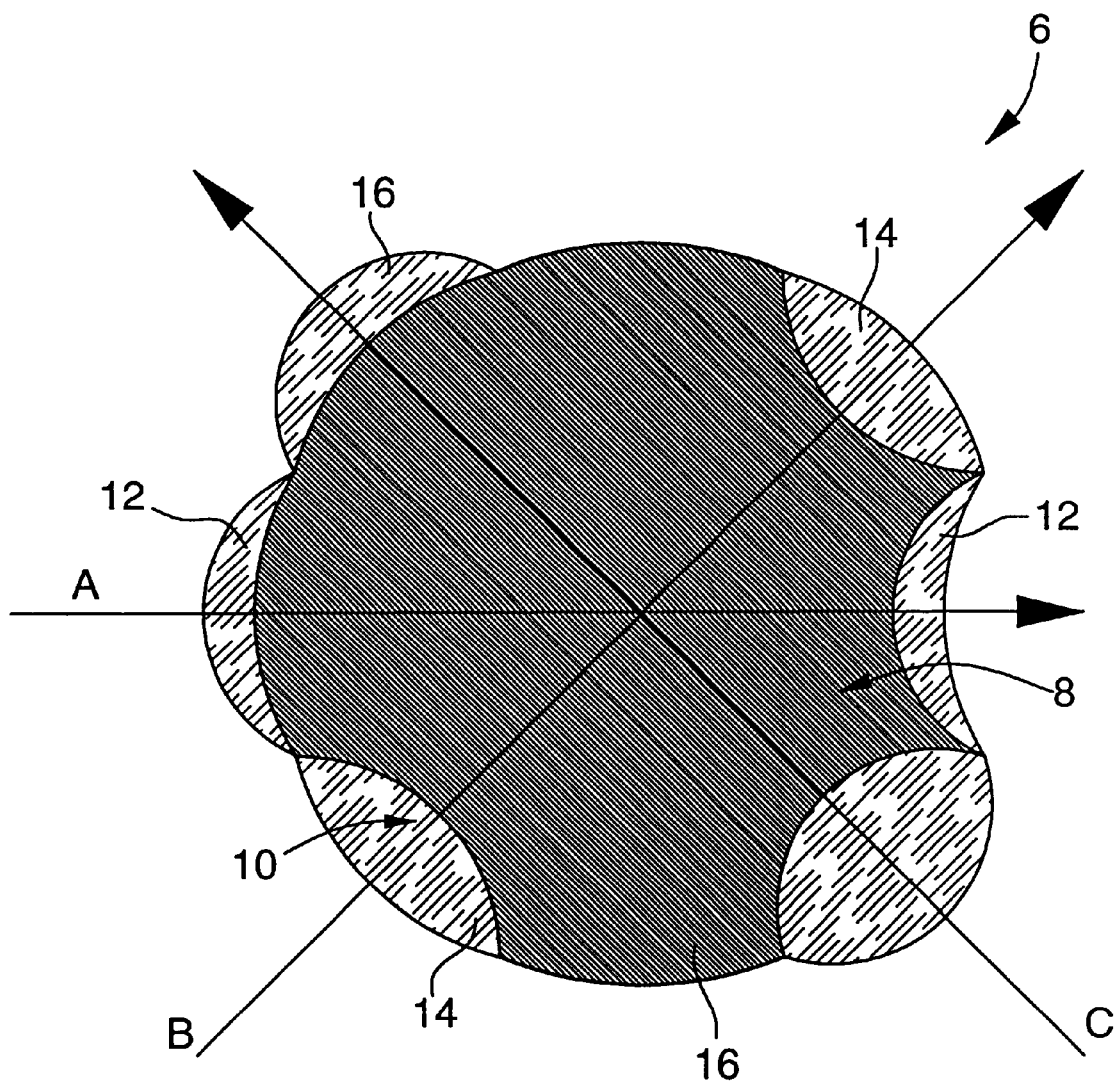
FIG. 5 illustrates a second embodiment of the invention having three distinct focal distances separated from each other by 45°.

It goes without saying that the number of materials selected to manufacture optical device 6 can be greater than two. These materials can be either glass, a plastic material or any of the suitable material. Care must simply be taken that the melting temperature of the first material used to make the core of device 6 is higher than that of the second material which is moulded around the first. Likewise, one may envisage an optical device having, for example, three different focal distances, spaced at 45° from each other as illustrated in FIG. 5. One may also envisage using the focal distance perpendicular to the lower and upper faces of optical device 6.

Figure 1:
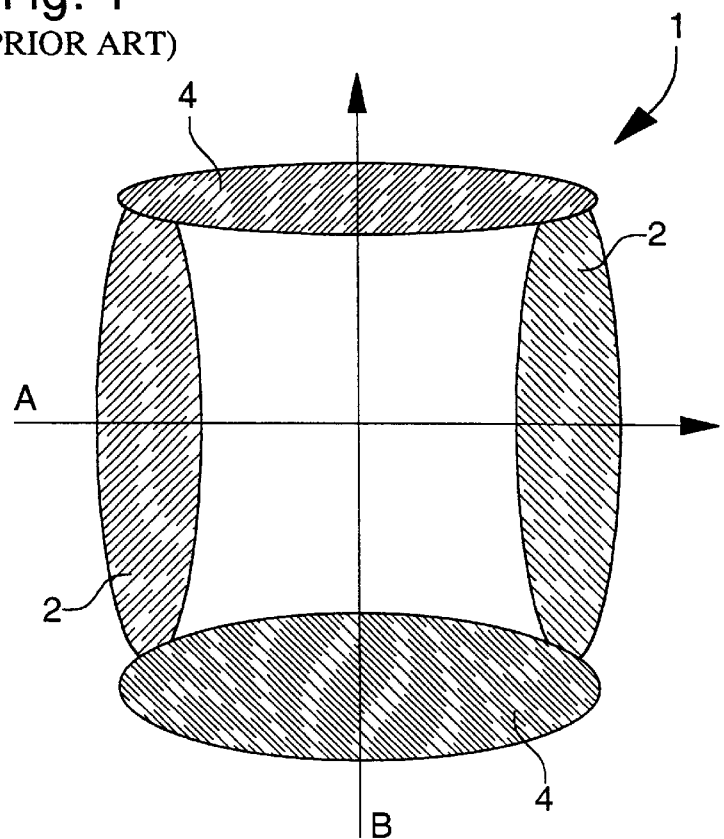
FIG. 1, already cited, is a schematic view of an embodiment of a multiple focal distance optical device according to the prior art.

According to a significant advantage of the invention, lenses 12, 14 and 16 are intimately attached to each other. The light is thus only reflected at the moment when it penetrates and when it emerges from optical device 6, so that it is easier to produce a high quality image. This reflection phenomenon may also be attenuated by coating the outer faces of optical device 6 with a layer of anti-glare material. It should be understood that at each lens/air interface, approximately 4% of the incident light is reflected. Thus, in the case of device 1 of the prior art shown in FIG. 1, the light undergoes four successive reflections as it passes through device 1, which represents an attenuation of the order of 15% of the transmitted light. Moreover, the light reflected at the lens/air interfaces contributes to the formation of so called ghost images which considerably deteriorate the quality of the resulting image. Only the use of a high quality and thus expensive anti-glare layers allows this problem to be overcome. Conversely, in the scope of the present invention, the use of an anti-glare coating of current quality is sufficient.

Figure 3:
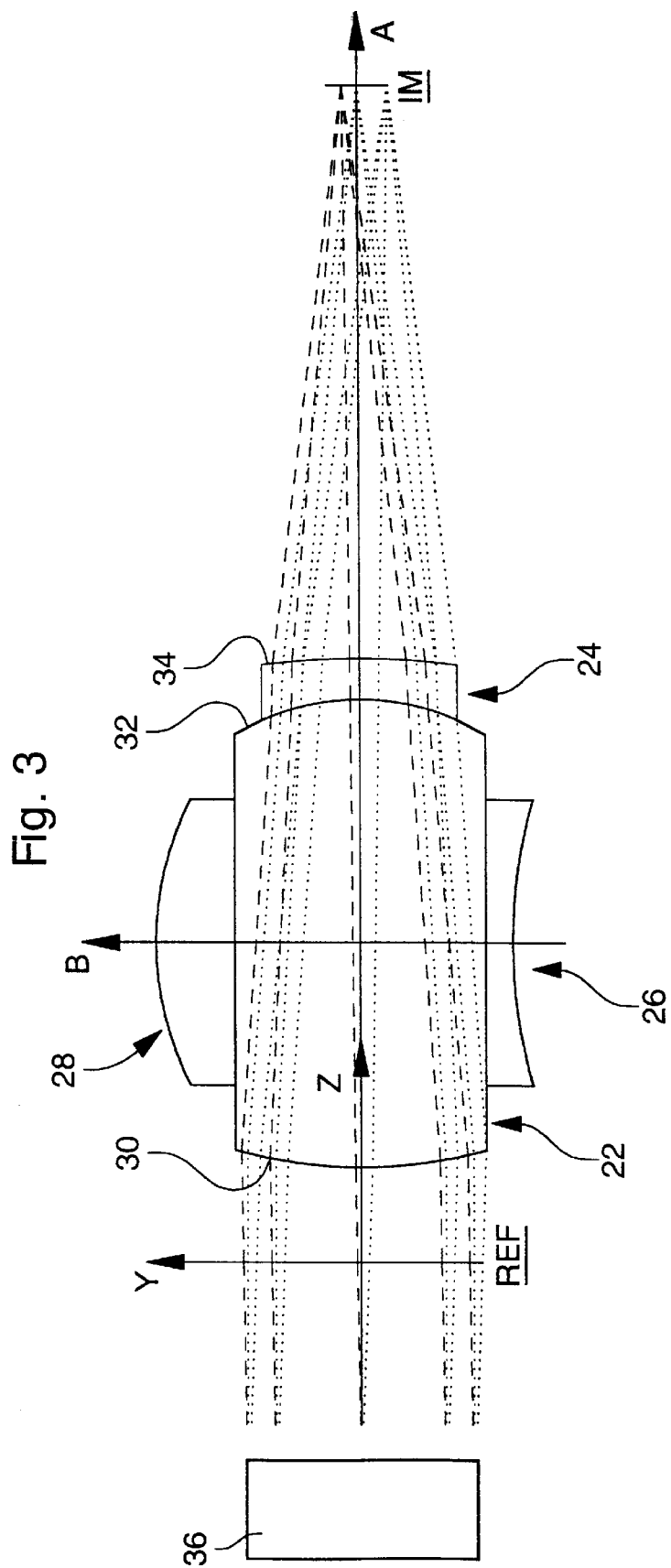
FIG. 3 shows a particular embodiment of the device according to the invention.

FIG. 3 shows a particular embodiment of optical device 6 according to the invention wherein focal distance A is determined by a pair of lenses 22 and 24 which are applied against and attached to each other, and focal distance B is determined by a triplet of lenses 26, 22 and 28 which are applied against and attached to each other. By way of example, lens 22 is made of poly-4-methyl-pentane of refractive index $n_1=1.47$, and lens 24 is made of polystyrene of refractive index $n_2=1.59$. Again by way of example, the curvature of the entry face 30 of lens 22, expressed as the complement form of the radius of curvature, is equal to 0.068 $mm^{-1}$, and the curvature of the exit face 32 of lens 22 is equal to 0.14 $mm^{-1}$. Finally, the curvature of the outlet face 34 of lens 24 is equal to 0.043 $mm^{-1}$. FIG. 3 also shows an orthogonal mark (Y, Z) arranged in the plane of the Figure and whose axis Z is directed along focal distance A. This mark (Y, Z) defines a reference plane REF from which the paths of the light rays from an object 36 situated at distance of the order of 200 mm from optical device 6 and focused in an image plane IM are calculated. The following distances are expressed along axis Z: reference plane REF is situated at 3 mm from the entry face 30 of lens 22; the thickness of lens 22 is 14.7 mm; the thickness of lens 24 is 1.3 mm and image plane IM is arranged at 18 mm from exit face 34 of lens 24.

Figure 4:
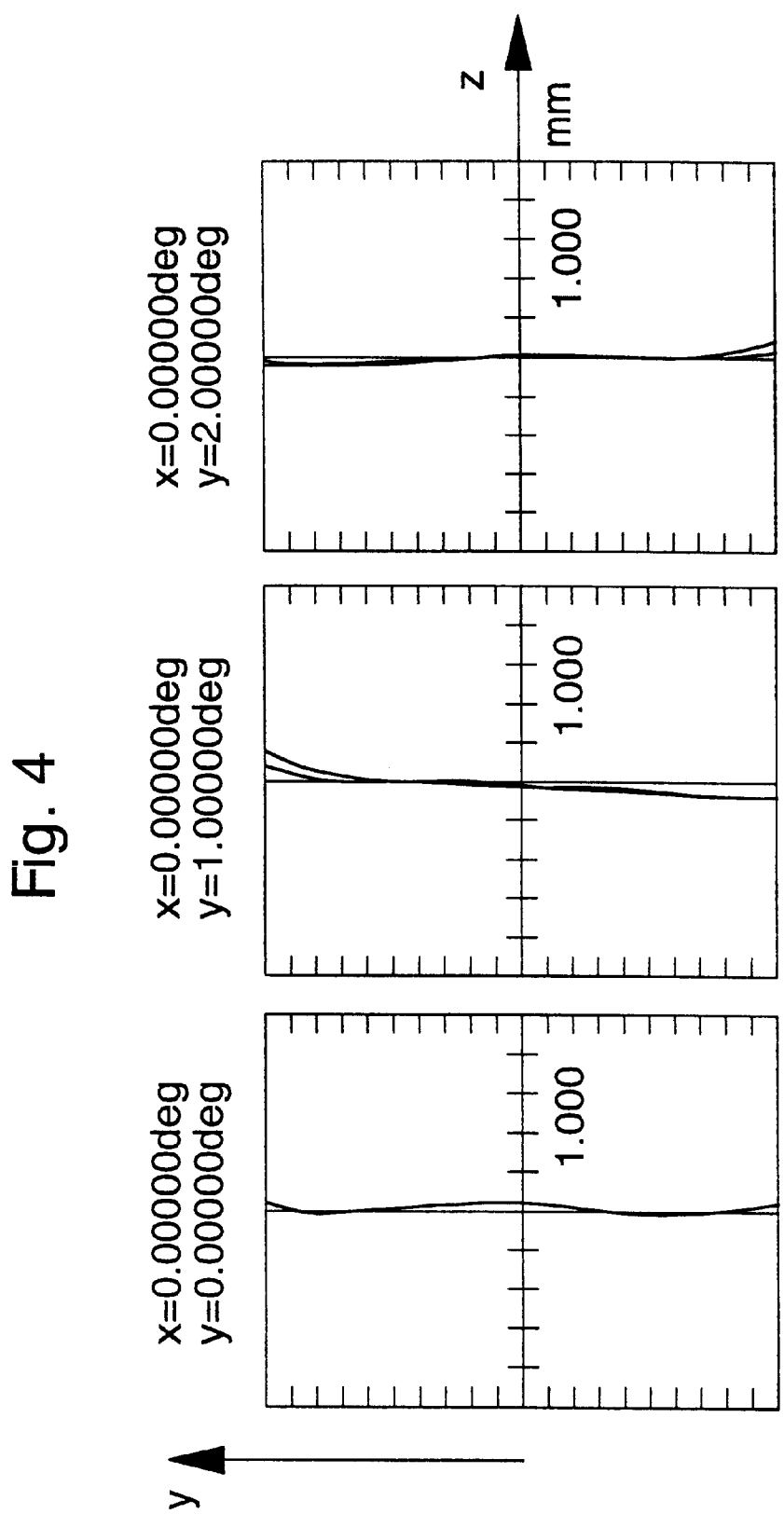
FIG. 4 shows the focusing of light rays from an object in the image plane the optical device of FIG. 3.

FIG. 4 gives the fluctuations in the neighbourhood of image plane IM of the focal point corresponding to the light rays from points of object 36 whose co-ordinates are respectively (Y=0°; Z=0°), (Y=1°; Z=0°) and (Y=−2°; Z=0°). As can be seen, the focusing of the light rays in image plane IM is excellent. These calculations were made for the entire visible spectrum with a wavelength of 656 nm as reference.

It goes without saying that various simple modifications and variants fall within the scope of the present invention. It will be noted in particular that the focal distances can each be formed of any number of lenses greater than or equal to two, the chromatic aberrations of such lenses compensating each other better the higher the number thereof.

What is claimed is:

1. A multiple focal distance light collecting optical device comprising, a monoblock structure formed of at least a first and a second transparent material shaped into lenses which are applied against and attached to each other, the refractive indices and radii of curvature of the faces of such lenses being determined to focus the light rays so as to create an image in accordance with at least two different focal distances which form between them a non-zero degree angle, wherein said first material comprises a core of a collecting optical device and said second material is molded around said first material, and wherein said first material used to make the core of said optical device has a melting temperature higher than that of the second material.

2. A multiple focal distance light collecting optical device comprising, a monoblock structure formed of at least a first and a second transparent material shaped into lenses which are applied against and attached to each other, the refractive indices and radii of curvature of the faces of such lenses being determined to focus the light rays so as to create an image in accordance with at least two different focal distances which form between them a non-zero degree angle, each focal distance being determined by a triplet of three lenses which are applied against and attached to each other, so that the chromatic aberrations of said lenses tend to compensate for each other.

3. An optical device according to claim 2, wherein said focal distances are perpendicular to each other.

4. An optical device according to claim 2, having three distinct focal distances, spaced at 45° from each other.

5. An optical device according to claim 2, having a focal distance perpendicular to a lower and an upper face of said optical device.

6. An optical device according to claim 2, wherein said first and second materials comprise a material selected from the group of materials consisting of glass or a plastic material.

7. An optical device according to claim 2, having external faces coated with a layer of anti-glare material.

8. An optical device according to claim 2, wherein said first material comprises a core of a collecting optical device and said second material is molded around said first material, and wherein said first material has a melting temperature higher than that of said second material.

9. An optical device according to claim 2, wherein said first and second materials have refractive indices equal to 1.47 and 1.59, respectively.

10. An optical device according to claim 9, wherein said first and second materials are poly-4-methyl-pentane and polystyrene.

11. A multiple focal distance light collecting optical device comprising, a monoblock structure formed of at least a first and a second transparent material differing by their respective first and second refractive indices, said first and second transparent materials each comprised within a first and second group of lenses, each of said first and second group of lenses comprising at least a first and a second lens applied against and attached to each other, the respective first and second refractive indices and radii of curvature of the faces of said respective first and second lenses of each of the first and second groups of lenses being determined to focus the light rays so as to create an image in accordance with at least a respective first and second focal distance which differ from each other and form between them a non-zero degree angle, wherein said optical device is pivoted to align the desired first or second focal distance with a single axis of light propagation, such that the light passes through at least said first and second transparent materials.

12. An optical device according to claim 11, said optical device comprising a core common to the at least first and second groups of lenses.

13. An optical device according to claim 11, wherein each focal distance is determined by a triplet of three lenses which are applied against and attached to each other, so that the chromatic aberrations of said lenses tend to compensate for each other.

14. An optical device according to claim 11, wherein said focal distances are perpendicular to each other.

15. An optical device according claim 11, having three distinct focal distances, spaced at 45° from each other.

16. An optical device according to claim 11, having a focal distance perpendicular to a lower and an upper face of said optical device.

17. An optical device according to claim 11, wherein said first and second materials comprise a material selected from the group of materials consisting of glass or a plastic material.

18. An optical device according to claim 11, having external faces coated with a layer of anti-glare material.

19. An optical device according to claim 11, wherein said first material comprises a core of a collecting optical device and said second material is molded around said first material, and wherein said first material has a melting temperature higher than that of the second material.

20. An optical device according to claim 11, wherein said first and second materials have refractive indices equal to 1.47 and 1.59, respectively.

21. An optical device according to claim 20, wherein said first and second materials are poly-4-methyl-pentane and polystyrene.

* * * * *